United States Patent
Yang et al.

(10) Patent No.: US 10,776,230 B2
(45) Date of Patent: Sep. 15, 2020

(54) METHOD FOR ESTABLISHING FAULT DIAGNOSIS TECHNIQUE BASED ON CONTINGENT BAYESIAN NETWORKS

(71) Applicant: BEIHANG UNIVERSITY, Beijing (CN)

(72) Inventors: Shunkun Yang, Beijing (CN); Xiaodong Gou, Beijing (CN); Tingting Huang, Beijing (CN); Daqing Li, Beijing (CN); Chong Bian, Beijing (CN); Yushu Xie, Beijing (CN); Wenjing Liu, Beijing (CN); Qi Yao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 133 days.

(21) Appl. No.: 16/198,574

(22) Filed: Nov. 21, 2018

(65) Prior Publication Data
US 2019/0087294 A1    Mar. 21, 2019

(30) Foreign Application Priority Data
May 11, 2018   (CN) .......................... 2018 1 0446523

(51) Int. Cl.
*G06F 11/22*   (2006.01)
*G06N 7/00*    (2006.01)
(52) U.S. Cl.
CPC ......... *G06F 11/2257* (2013.01); *G06N 7/005* (2013.01)
(58) Field of Classification Search
CPC ....... G06F 11/22; G06F 11/2257; G06N 7/00; G06N 7/005

USPC .......................................................... 714/26
See application file for complete search history.

(56) References Cited

U.S. PATENT DOCUMENTS

| | | | | |
|---|---|---|---|---|
| 8,370,241 | B1* | 2/2013 | Cotton | G06Q 40/06 705/36 R |
| 2009/0287623 | A1* | 11/2009 | Martin | G06N 7/005 706/13 |
| 2011/0208680 | A1* | 8/2011 | Bovey | G06N 7/005 706/12 |
| 2011/0276514 | A1* | 11/2011 | Kalagnanam | G06Q 10/06 705/348 |
| 2012/0136629 | A1* | 5/2012 | Tamaki | G05B 23/0254 702/183 |
| 2015/0327780 | A1* | 11/2015 | Kano | A61B 5/7278 600/407 |
| 2017/0071479 | A1* | 3/2017 | Kano | A61B 5/0044 |
| 2019/0004098 | A1* | 1/2019 | Wong | G01R 21/133 |

* cited by examiner

*Primary Examiner* — Kamini B Patel

(57) ABSTRACT

A method for establishing fault diagnosis technique based on contingent Bayesian networks, comprising steps of: step (1) determining a domain of an unknown object to be reasoned; step (2) defining a model structure by adopting a first-order logic language; step (3) generating a Blog model; step (4) transforming the Blog model into the contingent Bayesian networks; step (5) defining the contingent Bayesian networks; step (6) learning parameters of the contingent Bayesian networks; and step (7) reasoning a fault of the contingent Bayesian networks by utilizing a Markov chain Monte Carlo Method. By the steps mentioned above, establishing fault diagnosis technique based on contingent Bayesian networks is achieved.

8 Claims, 2 Drawing Sheets

US 10,776,230 B2

METHOD FOR ESTABLISHING FAULT DIAGNOSIS TECHNIQUE BASED ON CONTINGENT BAYESIAN NETWORKS

CROSS REFERENCE OF RELATED APPLICATION

The present application claims priority under 35 U.S.C. 119(a-d) to CN 201810446523.7, filed May 11, 2018.

BACKGROUND OF THE PRESENT INVENTION

Field of Invention

The present invention relates to The invention provides a method for establishing a fault diagnosis technique based on contingent Bayesian network, which relates to a fault diagnosis technique based on contingent Bayesian networks, and belongs to the field of software reliability diagnosis and software fault diagnosis.

Description of Related Arts

Embedded software has been widely applied and played a critical role in many major projects including aerospace and in daily life, and will become increasingly important in the industrialization process in the future. However, with the increase in size and complexity of the software, the probability of software failure is increasing. A plurality of major system accidents that have occurred in history are caused by embedded software errors. It is foreseeable that that fighting software failures is still an unavoidable subject for a long term in the future. Among them, fault diagnosis in software is an important part. For large software systems with large scale and complex behavior, it is very time-consuming and labor-intensive to diagnose and locate faults. Especially for complex embedded software systems with limited resources, due to the characteristics of real-time, concurrency, numerous interfaces, and frequent interactions, some random faults are easy to occur, that is, the fault phenomenon is uncertain and more difficult to reproduce and diagnose and locate accurately. It is a problem that needs to be studied in detail for diagnosing and reasoning the random faults discovered and their failure mechanisms.

The Bayesian network is a graphical network based on Bayesian theory on the basis of probabilistic reasoning, which is suitable for expressing and analyzing uncertain and probabilistic events. However, traditional Bayesian networks are generally suitable for establishing a fixed dependency structure for a limited number of random variables, fail to support the dynamic addition of unknown objects, and are subject to the constraints of acyclic constraints and a limited number of ancestors. However, the random and difficult-to-reproduce random faults of embedded software cause the ring-dependent and unknown number of objects in the model. Therefore, the traditional Bayesian network is not a satisfying means for quantitative reasoning of uncertain random faults. Contingent Bayesian Networks (CBNs), a generalization of Bayesian networks, representing the uncertainty of dependencies by marking each edge of the network model with a condition that indicates the activation state. The advantages of CBNs are that there are loops and can contain an infinite number of variables. CBNs use a formal language Blog to define a probability model containing unknown objects and perform uncertainty quantization. The Blog model defines a probability distribution of a model structure of a particular type of first-order logic language and is a probability model used to describe an unknown object. The Blog model is designed for reasoning unknown objects, and can contain variable, unlimited number of objects, and the uncertain relationship therebetween. The probabilistic model of an unknown object, i.e., the Blog model, describes a production process in which some steps are used to add objects, wherein some steps are used to determine the properties of these objects and the relationships therebetween. The contingent Bayesian network is capable of containing the characteristics of the ring and the infinite variables, making the contingent Bayesian network more suitable for reasoning the unknown relationship among unknown objects in the real world, and expanding the application range of the conventional Bayesian networks.

Due to large scale and complex functions, embedded software is prone to some random faults with uncertainties, so it is more difficult to reproduce and accurately locate. Once the fault happens, it is often very difficult to locate and eliminate, which is an urgent problem to be solved. Such random faults have the characteristics that the objects are unknown, the quantity is uncertain, and there may be dependencies between random faults. Therefore, the traditional Bayesian network is no longer suitable for the diagnosing and reasoning random faults. The d contingent Bayesian network has a ring and can contain an infinite number of variables, which is very suitable for the diagnosis of random faults. At the same time, the environmental interference while the software is running may also cause software failure. When diagnosing faults, the impact of environmental interference must also be considered. In response to this situation, we propose a method for establishing a fault diagnosis technique based on contingent Bayesian networks. In this technique, we use the contingent Bayesian network theory to treat an unknown number of fault phenomena and fault environment disturbances as unknown objects to establish a blog model, which is then transformed into the contingent Bayesian network, and then the Markov Monte Carlo method is used to perform fault reasoning for the contingent Bayesian network. Utilizing the technique is capable of fully taking advantage of the characteristics of the contingent Bayesian network of containing rings and an infinite number of variables to meet the actual diagnostic requirements of embedded software random faults and improve the quality of the fault diagnosis.

The software fault diagnosis technology is established based on the contingent Bayesian networks to form a fault diagnosis technique based on the contingent Bayesian network. While improving the quality of software fault diagnosis, the present invention is capable of achieving the purpose of improving software credibility.

SUMMARY OF THE PRESENT INVENTION

(I) Object of the Present Invention

The Bayesian network is a graphical network on the basis of Bayesian theory based on probabilistic reasoning for expressing and analyzing uncertain and probabilistic events, which is often used for fault reasoning. However, since the Bayesian network is subject to the acyclic constraints and constraints of finite number of ancestors, the Bayesian network is only applicable to the establishment of a fixed dependency structure for a finite number of random variables, and fails to support dynamic joining of unknown objects. Thus, the present invention provides a method for establishing fault diagnosis technique based on a contingent Bayesian network in combination with the contingent Bayesian network theory. The contingent Bayesian network is configured to represent the uncertainty of the dependency by marking each edge of the network model with a condition indicating an activation state, and thus the contingent Bayesian network can have a ring and contain an infinite number of variables. In the present invention, the contingent Bayesian network theory is adopted to establish a Blog model using an unknown number of fault phenomena and fault environment constrains, which are converted into the contingent Bayesian networks. Finally Markov chain Monte Carlo method is adopted for fault reasoning of the contingent Bayesian network. Using the technology, the characteristics of the contingent Bayesian network having rings and containing an infinite number of variables can be fully utilized to meet actual diagnostic requirements of random faults in embedded software, so as to improve the quality of fault diagnosis.

It can be seen that the establishment of the technique integrates and innovates conventional Bayesian network theory and fault diagnosis reasoning technique to form the fault diagnosis technique based on contingent Bayesian network.

(II) Technical Solutions

The technical solutions of the present invention are as following: a method for establishing fault diagnosis technique based on contingent Bayesian networks comprising processes as follows.

In the method mentioned above, CBNFD is cited to describe the Fault Diagnosis technique based on Contingent Bayesian Networks.

The present invention provides a method for establishing fault diagnosis technique based on contingent Bayesian networks, comprising steps of:

step (1) determining a domain of an unknown object to be reasoned;

step (2) defining a model structure by adopting a first-order logic language;

step (3) generating a Blog model;

step (4) transforming the Blog model into the contingent Bayesian networks;

step (5) defining the contingent Bayesian networks;

step (6) learning parameters of the contingent Bayesian networks; and step (7) reasoning a fault of the contingent Bayesian networks by utilizing a Markov chain Monte Carlo Method;

wherein by steps mentioned above, establishing the fault diagnosis technique based on the contingent Bayesian networks is completed; based on a contingent Bayesian networks theory, the Blog model is established by an unknown quantity of interferences of fault phenomenon and fault environment; and then the Blog model is transformed into the contingent Bayesian networks; and finally the fault of the contingent Bayesian networks is reasoned by utilizing the Markov chain Monte Carlo Method; the present invention is suitable for solving practical software faults diagnosis problems; adopting the technique is capable of fully taking advantage characteristics of contingent Bayesian networks of having rings and containing an infinite number of variables, so as to meet actual diagnostic requirements of random faults of embedded software, improve quality of fault diagnosis, and possess high practical application value.

Preferably, the step (1) of determining a domain of an unknown object to be reasoned comprises steps of: determining a type of software fault in which an amount of software to be tested is unknown and a type of environmental constrain that the software is facing during operation by software testing; wherein Fault represents software fault, Constrain represents environmental constrain which causes fault; amounts of both the Fault and Constrain are unknown.

Preferably, in the step (2) defining the model structure by adopting the first-order logic language, the first-order logic language which is typed comprises a set of type symbols and a set of functor symbols f, each of the functor symbols f has a type tag $ts(t_1, \ldots, t_i, \ldots, t_{or})$, wherein $i=1, 2, \ldots,$ or, each of the $t_i$ is a type symbol, or is an order of a functor symbol, if or=0, the functor symbol is a constant symbol; meanwhile, each of the functor symbol f has a return value R, and the return value R is a null value null;

wherein W represents a defined model structure, W defines an extension of each type, an interpretation of each function statement, and specifies object sets exist in each type and values of each function symbol; w comprises extensions $[R]^w$ of each type, wherein $[R]^w$ is a set of objects of the type in W, an extension of the type symbols $t_i$ is denoted as $[t_i]^w$; each of the functor symbols f comprises an explanation $[f]^w$, wherein $[f]^w$ is a function at a range of $[t_i]^w$ to $[R]^w$.

Preferably, in the step (3) of generating the Blog model, the Blog model is a probabilistic model describing an unknown object, which describes a production process for sampling the model structure w to determine probability distribution of W; the Blog model comprises two types of sampling operations, wherein a first type sampling operation is to create a new object, which is completed by a numeric statement, a second type sampling operation is to sample values of functor of some objects, which is completed by a dependency statement, wherein the dependency statement and the numerical statement form a main part of the Blog model;

the dependency statement describes how to determine a value of the functor applied to each object; wherein a left side of the dependency statement is the functor symbols and parameter variables of the functor symbols, and a right side is statements containing a structure of if-then-else; when sampling, each sentence of the if-then-else statement is checked until a true sentence is found, a value of the functor corresponding to the true sentence is a parameter of the conditional probability distribution; if sentences of the if-then-else statement are all false, a return value of the functor is null, and a parameter of corresponding conditional probability distribution is also null;

the numerical statement creates a new object of the model, a left side of the numerical statement contains a set of conditions that constitute a potential object, a right side of the numerical statement has an identical form as the dependency statement;

besides the dependency statement and the numerical statement, the Blog model also comprises: a type declaration statement for introducing a type; a random function declaration statement for specifying a type label of the functor symbol, whose value is randomly selected during a generation process; a guarantee statement for guaranteeing and naming all the different objects in W;

on a basis of the model structure, the Blog model is established by the dependency statement and the numerical statement to describe a generation process; the Blog model is configured to continuously add new objects to the model based on existing objects, so the Blog model is capable of containing objects which are changing and with unlimited number and uncertain relationships between the objects.

Preferably, the step (4) of transforming the Blog model into the contingent Bayesian networks comprises steps of: taking type symbols $t_i$ and a set of functor symbols f in the Blog model as nodes of the Bayesian networks; taking a function symbol on a right side of a dependency statement of the functor symbol f, and a function symbol on a right side of a numerical statement of the symbols $t_i$ as a parent node; according to a generation process described by the Blog model, compiling an entire Bayesian network, which is denoted as BNs; wherein for the present invention, the software fault Fault and the environmental constrain Constrain of the software fault are nodes of the BNs; because an amount of the objects of the Blog model is uncertain, dependence relationships between the objects of the Blog model are also uncertain, BNs compiled according to the Blog model contain an infinite number of nodes and contain rings.

Preferably, the step (5) of defining the contingent Bayesian networks, comprises steps of: wherein a topology of the Bayesian network is a directed acyclic graph, and the BNs compiled according to the Blog model contain an infinite number of nodes and have a ring, which does not conform to definition of classical Bayesian networks, thus in the present invention BNs is converted to Contingent Bayesian Networks, denoted as CBNs;

according to actual situations, specifying mutually exclusive conditions for edges in the BNs pointing to an identical node and from identical nodes, under specific conditions, only a limited number of edges satisfy the specific conditions and are active, nodes connected by the limited number of edges have a logical causal relationship, and the nodes in an inactive state are ignored in analysis, that is, even there are an infinite number of ancestor nodes in the CBNs, the CBNs is only affected by a limited number of ancestors during analysis; and furthermore, specifying mutually exclusive conditions for edges of each ring of the CBNs as well; wherein only edges satisfying specific condition are active; edges failing to satisfy the specific condition are temporarily removed in analysis; by generating the CBNs for the edges of the BNs, problems of an unlimited number of nodes and rings are solved.

Preferably, the step (6) learning parameters of the contingent Bayesian networks comprises steps of: wherein since the present invention generates the contingent Bayesian networks from the Blog model, the network structure is determined, only performing parameter learning of the network, that is, determining conditional probability of each node of the contingent Bayesian networks; wherein the parameter learning refers to under conditions of a given network topology G and a training sample set D, utilizing a priori knowledge to determine the conditional probability distribution of each node of the dependence Bayesian network model;

performing parameter learning of the CBNs utilizing maximum likelihood estimation, assuming that there are n nodes in which the CBNs are active under specific conditions, which is noted as $\{X_1, \ldots, X_i, \ldots X_n\}$, and meanwhile assuming that the i-th node has $r_i$ values, and a parent node of $X_i$ is denoted as pa($X_i$), pa($X_i$) has $q_i$ values; parameters to be calculated is $\theta = \{\theta_{ijk} | i=1, \ldots, n; j=1, \ldots, q_i; k=1, \ldots, r_i\}$, where j and k respectively refer to values of the parent nodes pa($X_i$) and the node $X_i$; and logging likelihood function L($\theta$|D) to obtain:

$$l(\theta | D) = \log L(\theta | D) = \log \prod_{l=1}^{m} P(d_l | \theta) = \sum_{i=1}^{n} \sum_{j=1}^{q_i} \sum_{k=1}^{r_i} m_{ijk} \log \theta_{ijk};$$

wherein $m_{ijk}$ is a sample capacity in a sample set D that satisfies $X_i$=k and pa($X_i$)=j, the sum, l($\theta$|D) is a logarithm of the likelihood function L($\theta$|D), and performing Lagrangian multiplier method to a formula mentioned above to obtain maximum likelihood estimate of a parameter $\theta$, thereby determining parameters of the CBNs.

Preferably, the step (7) of reasoning a fault of the contingent Bayesian networks by utilizing a Markov chain Monte Carlo Method, the Markov chain Monte Carlo Method is denoted as MCMC, wherein the MCMC is widely applied in Bayesian inference, Gibbs sampling which is of widest use in MCMC is adopted in the present invention to perform fault reasoning on the contingent Bayesian networks; Gibbs sampling is a special case in MCMC, wherein a first dimension is alternately fixed, and values of other dimension are adopted to sample a value in the first dimension; if a probability of occurrence of an event A=$\{X_1, X_2, \ldots X_s\}$ needs to be reasoned, wherein $X_1, X_2, \ldots, X_s$ are nodes of CBNs, i.e., software fault Fault and environmental constrain of the fault Constrain, and s≤n wherein a joint probability distribution of an event A is denoted as $\Phi$(A), wherein a process of the Gibbs sampling comprises steps of:

(1) initializing comprising: randomly giving $X_1, X_2, \ldots, X_s$ initial values $A_0 = \{X_1^0, X_2^0, \ldots X_s^0\}$;

(2) generating $X_1^1$ by p($X_1|X_2^0, \ldots X_s^0$);

(3) in a same way as the step (2), fixing other variables, generating $X_2^1, \ldots, X_s^1$ in sequence to obtain a new event $A_1 = \{X_1^1, X_2^1, \ldots X_s^1\}$; and (4) repeating steps 2-3 to obtain a Markov chain $\{A_1, A_2, \ldots A_t\}$ wherein t is a sampling time;

wherein through steps mentioned above, the conditional distribution is simulated to simulate the joint distribution, and then the conditional distribution is directly derived through the joint distribution simulated, in such a manner that the contingent Bayesian networks reasoning is achieved to complete fault diagnosis.

By the steps mentioned above, establishing fault diagnosis technique based on contingent Bayesian networks is achieved. In the present invention, the contingent Bayesian network theory is adopted to establish a Blog model using an unknown number of fault phenomena and fault environment constrains, which are converted into the contingent Bayesian networks. Finally Markov chain Monte Carlo method is adopted for fault reasoning of the contingent Bayesian network. The present invention is suitable for solving actual problems of software fault diagnosis. Using the technology, the characteristics of the contingent Bayesian network having rings and containing an infinite number of variables can be fully utilized to meet actual diagnostic requirements of random faults in embedded software, so as to improve the quality of fault diagnosis.

(III) Beneficial Effects

Compared with the conventional arts, the present invention has beneficial effects as follows.

Compared with the conventional arts, the advantage of the present invention is as follows. The conventional fault diagnosis technique based on Bayesian network is only suitable for a limited number of random variables to establish a fixed dependency structure due to the constraints of the acyclic constraints of the Bayesian network and the assumption of limited number of ancestors, and the dynamic joining of unknown objects is not supported. However, the fault of large embedded software often has the characteristics that the object is unknown, the quantity is uncertain, and there may be dependencies between random faults, so the conventional Bayeux networks are not suitable for diagnosing complex embedded software. Therefore, the present invention adopts the contingent Bayesian network to mark each edge of the Bayesian network model with a condition indicating an activation state to indicate uncertainty of the dependency, and thus the present invention is capable of having a ring and containing an infinite number of variables. The present invention integrates and innovates the conventional contingent Bayesian network and software fault diagnosis methods, and provides a fault diagnosis technique based on the contingent Bayesian network.

These and other objectives, features, and advantages of the present invention will become apparent from the following detailed description, the accompanying drawings, and the appended claims.

References numbers, symbols in the Figures are as follows.

Figure 1:
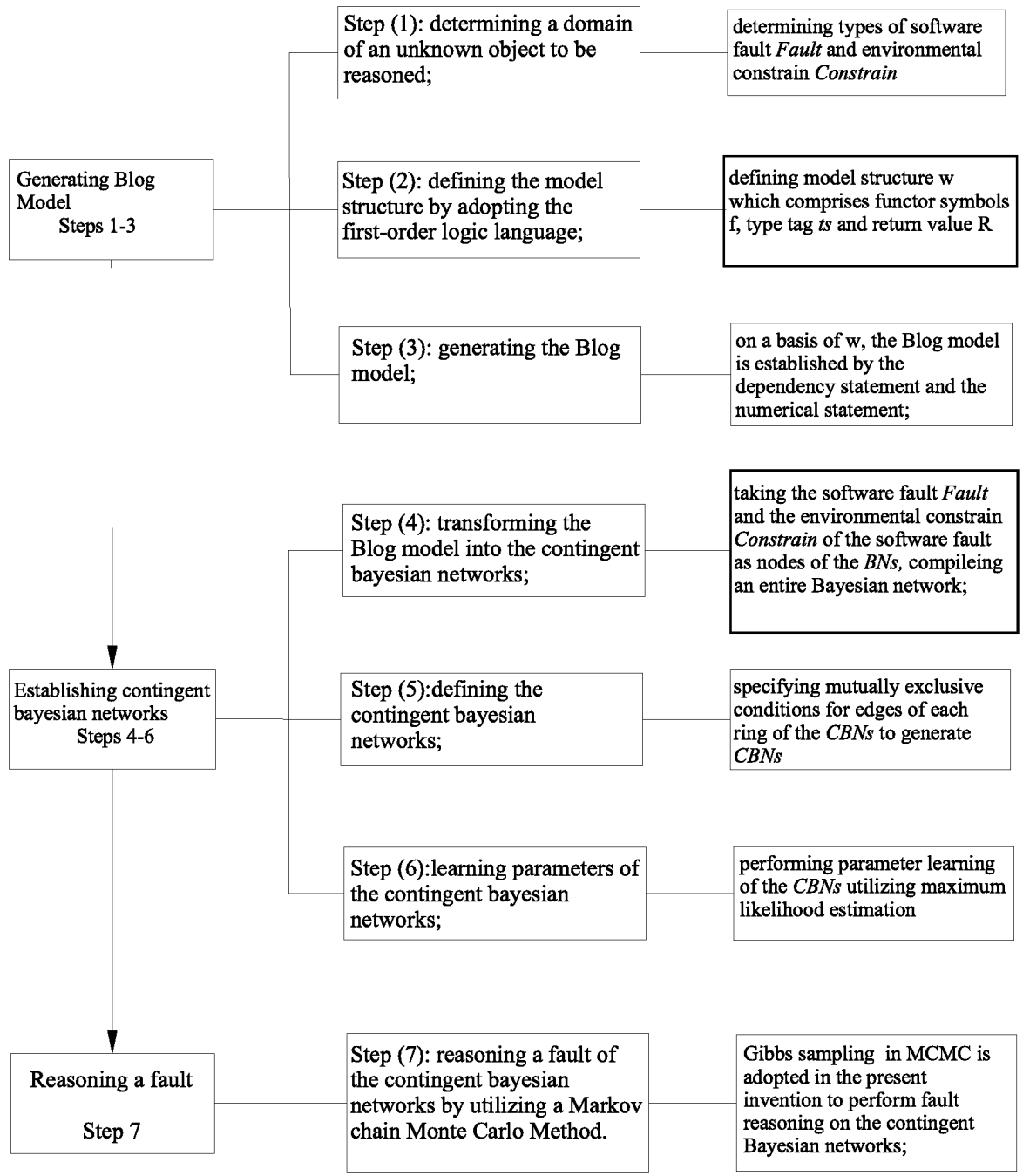
FIG. 1 is a flow chart of overall steps of the method of the present invention.
Figure 2:
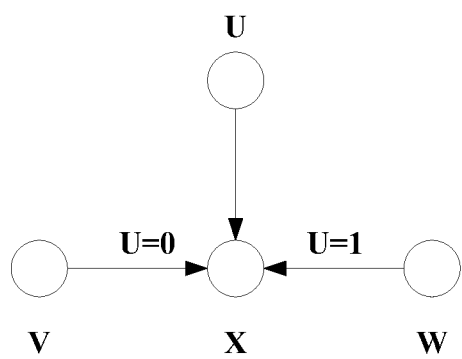
FIG. 2 is a simple sketch view of contingent Bayesian networks of the present invention.

Steps 1-8 in FIG. 1 are corresponding steps in the technical solutions;

The Fault and Constrain in FIG. 1 are software faults and environmental constrains;

The w, f, ts, and R in FIG. 1 are respectively model structure, functor symbol, type label, and return value;

The BNs and CBNs in FIG. 1 are Bayesian networks and contingent Bayesian networks;

The MCMC in FIG. 1 is the Markov chain Monte Carlo method;

U, V, W, and X in FIG. 2 are events.

DETAILED DESCRIPTION OF THE PREFERRED EMBODIMENT

In order to make the technical problems to be solved, the technical solutions and advantages of the present invention more apparent, further description of the present invention is illustrated in detail combining with the accompanying drawings.

The present invention provides a method for establishing fault diagnosis technique based on contingent Bayesian networks. Technique established by the method of the present invention is capable of improving quality of software fault diagnosis. In the technique, based on the theory of contingent Bayesian networks, for complex embedded software faults have characteristics that the objects are unknown, the quantity is uncertain, and there may be dependencies between random faults, the present invention takes software faults and environmental disturbances as nodes to establish the contingent Bayesian network with infinite nodes and rings. The Markov chain Monte Carlo method is then adopted for diagnostic reasoning. When the technique is adopted for fault diagnosis, the Bayesian network established is more in line with the fault characteristics of large embedded software, and the diagnostic accuracy is higher.

As shown in FIG. 1, the present invention provides a method for establishing fault diagnosis technique based on contingent Bayesian networks, wherein a specific establishing method is as follows:

Step (1) determining a domain of an unknown object to be reasoned, wherein a establishing process is as follows: determining a type of software fault in which an amount of software to be tested is unknown and a type of environmental constrain that the software is facing during operation by software testing; wherein Fault represents software fault, Constrain represents environmental constrain which causes fault; amounts of both the Fault and Constrain are unknown.

Step (2) defining the model structure by adopting the first-order logic language, wherein a establishing method is as follows: the first-order logic language which is typed comprises a set of type symbols and a set of functor symbols f, each of the functor symbols f has a type tag $ts(t_1, \ldots, t_i, \ldots, t_{or})$, wherein $i=1, 2, \ldots$, or, each of the $t_i$ is a type symbol, or is an order of a functor symbol, if or=0, the functor symbol is a constant symbol; meanwhile, each of the functor symbol f has a return value R, and the return value R is a null value null;

wherein when a functor is not suitable for a parameter, return back to the null of a special value, and any function that receives null as a parameter also returns null;

wherein W represents a defined model structure, W defines an extension of each type, an interpretation of each function statement, and specifies object sets exist in each type and values of each function symbol; W comprises extensions $[R]^w$ of each type, wherein $[R]^w$ is a set of objects of the type in W, an extension of the type symbols $t_i$ is denoted as $[t_i]^w$; each of the functor symbols f comprises an explanation $[f]^w$, wherein $[f]^w$ is a function at a range of $[t_i]^w$ to $[R]^w$.

Step (3) generating the Blog model wherein a establishing method is as follows: the Blog model is a probabilistic model describing an unknown object, which describes a production process for sampling the model structure W to determine probability distribution of W; the Blog model comprises two types of sampling operations, wherein a first type sampling operation is to create a new object, which is completed by a numeric statement, a second type sampling operation is to sample values of functor of some objects, which is completed by a dependency statement, wherein the dependency statement and the numerical statement form a main part of the Blog model;

the dependency statement describes how to determine a value of the functor applied to each object; wherein a left side of the dependency statement is the functor symbols and parameter variables of the functor symbols, and a right side is statements containing a structure of if-then-else; when sampling, each sentence of the if-then-else statement is checked until a true sentence is found, a value of the functor corresponding to the true sentence is a parameter of the conditional probability distribution; if sentences of the if-then-else statement are all false, a return value of the functor is null, and a parameter of corresponding conditional probability distribution is also null;

the numerical statement creates a new object of the model, a left side of the numerical statement contains a set of conditions that constitute a potential object, a right side of the numerical statement has an identical form as the dependency statement;

besides the dependency statement and the numerical statement, the Blog model also comprises: a type declaration statement for introducing a type; a random function declaration statement for specifying a type label of the functor symbol, whose value is randomly selected during a generation process; a guarantee statement for guaranteeing and naming all the different objects in W;

wherein establishing a Blog Model firstly adopts a type declaration statement, the type of the object introduced, comprises the Fault and Constrain of Step 1; then use a random function statement to specify the type tag of the functor symbol and specify types of the parameters and return value; Secondly, use the guarantee object statement to name all possible objects; if there are i kinds of faults and j kinds of environmental constrain, which can be expressed as $Fault_1, Fault_2, \ldots Fault_i, Constrain_1, Constrain_2, \ldots Constrain_j$, and then the dependency statement and the numerical statement are utilized to establish a main part of the Blog model;

on a basis of the model structure, the Blog model is established by the dependency statement and the numerical statement to describe a generation process; the Blog model is configured to continuously add new objects to the model based on existing objects, so the Blog model is capable of containing objects which are changing and with unlimited number and uncertain relationships between the objects.

Step (4) transforming the Blog model into the contingent Bayesian networks, wherein a establishing method is as follows: taking type symbols $t_i$ and a set of functor symbols f in the Blog model as nodes of the Bayesian networks; taking a function symbol on a right side of a dependency statement of the functor symbol f, and a function symbol on a right side of a numerical statement of the symbols $t_i$ as a parent node; according to a generation process described by the Blog model, compiling an entire Bayesian network, which is denoted as BNs; wherein for the present invention, the software fault Fault and the environmental constrain Constrain of the software fault are nodes of the BNs; because an amount of the objects of the Blog model is uncertain, dependence relationships between the objects of the Blog model are also uncertain, BNs compiled according to the Blog model contain an infinite number of nodes and contain rings.

Step (5) defining the contingent Bayesian networks, wherein a establishing method is as follows: a topology of the Bayesian network is a directed acyclic graph, and the BNs compiled according to the Blog model contain an infinite number of nodes and may have a ring, which does not conform to definition of classical Bayesian networks, thus in the present invention BNs is converted to Contingent Bayesian Networks, denoted as CBNs;

according to actual situations, specifying mutually exclusive conditions for edges in the BNs pointing to an identical node and from identical nodes, under specific conditions, only a limited number of edges satisfy the specific conditions and are active, nodes connected by the limited number of edges have a logical causal relationship, and the nodes in an inactive state are ignored in analysis, that is, even there are an infinite number of ancestor nodes in the CBNs, the CBNs is only affected by a limited number of ancestors during analysis; and furthermore, specifying mutually exclusive conditions for edges of each ring of the CBNs as well; wherein only edges satisfying specific condition are active; edges failing to satisfy the specific condition are temporarily removed in analysis; by generating the CBNs for the edges of the BNs, problems of an unlimited number of nodes and rings are solved.

Step (6) learning parameters of the contingent Bayesian networks, wherein a establishing method is as follows: since the present invention generates the contingent Bayesian networks from the Blog model, the network structure is determined, only performing parameter learning of the network, that is, determining conditional probability of each node of the contingent Bayesian networks; wherein the parameter learning refers to under conditions of a given network topology G and a training sample set D, utilizing a priori knowledge to determine the conditional probability distribution of each node of the dependence Bayesian network model; wherein the prior distribution generally obeys a certain probability distribution family; if the variable has two states, then the variable obeys the β distribution; if the variable has more than two states, the variable obeys multiple Dirichlet distributions and a certain strategy is utilized to estimate parameters of the distribution;

performing parameter learning of the CBNs utilizing maximum likelihood estimation, assuming that there are n nodes in which the CBNs are active under specific conditions, which is noted as $\{X_1, \ldots, X_i, \ldots X_n\}$, and meanwhile assuming that the i-th node has r values, and a parent node of $X_1$ is denoted as $pa(X_i)$, $pa(X_i)$ has $q_i$ values; parameters to be calculated is $\theta = \{\theta_{ijk} | i=1, \ldots, n; j=1, \ldots, q_i; k=1, \ldots, r_i\}$, where j and k respectively refer to values of the parent nodes $pa(X_i)$ and the node $X_i$; and logging likelihood function $L(\theta|D)$ to obtain:

$$l(\theta|D) = \log L(\theta|D) = \log \prod_{l=1}^{m} P(d_l | \theta) = \sum_{i=1}^{n} \sum_{j=1}^{q_i} \sum_{k=1}^{r_i} m_{ijk} \log \theta_{ijk};$$

wherein $m_{ijk}$ is a sample capacity in a sample set D that satisfies $X_i=k$ and $pa(X_i)=j$, the sum, $l(\theta|D)$ is a logarithm of the likelihood function $L(\theta|D)$, and performing Lagrangian multiplier method to a formula mentioned above to obtain maximum likelihood estimate of a parameter θ, thereby determining parameters of the CBNs.

Step (7) reasoning a fault of the contingent Bayesian networks by utilizing a Markov chain Monte Carlo Method, wherein a establishing method is as follows: the Markov chain Monte Carlo Method is denoted as MCMC, based on the Markov process, in order to sample on a specified distribution, according to the Markov process, first simulate the Markov process from any state, continuously perform state transition, and finally converge to a stationary distribution; wherein the MCMC is widely applied in Bayesian inference, Gibbs sampling which is of widest use in MCMC is adopted in the present invention to perform fault reasoning on the contingent Bayesian networks;

Gibbs sampling is a special case in MCMC, wherein a first dimension is alternately fixed, and values of other dimension are adopted to sample a value in the first dimension; if a probability of occurrence of an event $A=\{X_1, X_2, \ldots X_s\}$ needs to be reasoned, wherein $X_1, X_2, \ldots, X_s$ are nodes of CBNs, i.e., software fault Fault and environmental constrain of the fault Constrain, and s≤n, wherein a joint probability distribution of an event A is denoted as Φ(A), wherein a process of the Gibbs sampling comprises steps of:

(1) initializing comprising: randomly giving $X_1, X_2, \ldots, X_s$ initial values $A_0=\{X_1^0, X_2^0, \ldots X_s^0\}$;

(2) generating $X_1^1$ by $p(X_1|X_2^0, \ldots X_s^0)$;

(3) in a same way as the step (2), fixing other variables, generating $X_2^1, \ldots, X_s^1$ in sequence to obtain a new event $A_1=\{X_1^1, X_2^1, \ldots X_s^1\}$; and (4) repeating steps 2-3 to obtain a Markov chain $\{A_1, A_2, \ldots A_t\}$ wherein t is a sampling time;

wherein through steps mentioned above, the conditional distribution is simulated to simulate the joint distribution, and then the conditional distribution is directly derived through the joint distribution simulated, in such a manner that the contingent Bayesian networks reasoning is achieved to complete fault diagnosis.

Through the above steps, the establishment of the fault diagnosis technique based on the contingent Bayesian networks can be completed. In this technique, we take advantage of the characteristics that Bayesian network theory can contain infinite nodes and rings. We take embedded software faults and environmental constrains with characteristics of unknown objects, uncertain quantities, and possible dependencies between random faults as the node of the contingent Bayesian network, and a condition indicating the activation state is specified for each edge of the network to indicate the uncertainty of the dependency. Then the Markov chain Monte Carlo method is used for the reasoning diagnosis. When the technology is used for fault diagnosis, the Bayesian network established is more suitable for the fault characteristics of large embedded software, and the diagnostic accuracy is higher.

The fault prediction technology is constructed based on the theory of contingent Bayesian networks, and a more practical fault diagnosis technology based on contingent Bayesian networks is formed.

The details not described in the present invention is well known to the skills in the art.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for establishing fault diagnosis technique based on contingent Bayesian networks, comprising steps of:

step (1) determining a domain of an unknown object to be reasoned;

step (2) defining a model structure by adopting a first-order logic language;

step (3) generating a Blog model;

step (4) transforming the Blog model into the contingent Bayesian networks;

step (5) defining the contingent Bayesian networks;

step (6) learning parameters of the contingent Bayesian networks; and step (7) reasoning a fault of the contingent Bayesian networks by utilizing a Markov chain Monte Carlo Method;

wherein by steps mentioned above, establishing the fault diagnosis technique based on the contingent Bayesian networks is completed; based on a contingent Bayesian networks theory, the Blog model is established by an unknown quantity of interferences of fault phenomenon and fault environment; and then the Blog model is transformed into the contingent Bayesian networks; and finally the fault of the contingent Bayesian networks is reasoned by utilizing the Markov chain Monte Carlo Method; the present invention is suitable for solving practical software faults diagnosis problems; adopting the technique is capable of fully taking advantage characteristics of contingent Bayesian networks of having rings and containing an infinite number of variables, so as to meet actual diagnostic requirements of random faults of embedded software, improve quality of fault diagnosis, and possess high practical application value.

2. The method for establishing fault diagnosis technique based on the contingent Bayesian networks, as recited in claim 1, wherein the step (1) of determining a domain of an unknown object to be reasoned comprises steps of: determining a type of software fault in which an amount of software to be tested is unknown and a type of environmental constrain that the software is facing during operation by software testing; wherein Fault represents software fault, Constrain represents environmental constrain which causes fault; amounts of both the Fault and Constrain are unknown.

3. The method for establishing fault diagnosis technique based on the contingent Bayesian networks, as recited in claim 1, wherein in the step (2) defining the model structure by adopting the first-order logic language, the first-order logic language which is typed comprises a set of type symbols and a set of functor symbols f, each of the functor symbols f has a type tag $ts(t_1, \ldots, t_i, \ldots, t_{or})$, wherein i=1, 2, . . . , or, each of the $t_i$ is a type symbol, or is an order of a functor symbol, if or=0, the functor symbol is a constant symbol; meanwhile, each of the functor symbol f has a return value R, and the return value R is a null value null;

wherein W represents a defined model structure, W defines an extension of each type, an interpretation of each function statement, and specifies object sets exist in each type and values of each function symbol; W comprises extensions $[R]^w$ of each type, wherein $[R]^w$ is a set of objects of the type in W, an extension of the type symbols $t_i$ is denoted as $[t_i]^w$ each of the functor symbols f comprises an explanation $[f]^w$, wherein $[f]^w$ is a function at a range of $[t_i]^w$ to $[R]^w$.

4. The method for establishing fault diagnosis technique based on the contingent Bayesian networks, as recited in claim 1, wherein in the step (3) of generating the Blog model, the Blog model is a probabilistic model describing an unknown object, which describes a production process for sampling the model structure W to determine probability distribution of W; the Blog model comprises two types of sampling operations, wherein a first type sampling operation is to create a new object, which is completed by a numeric statement, a second type sampling operation is to sample values of functor of some objects, which is completed by a dependency statement, wherein the dependency statement and the numerical statement form a main part of the Blog model;

the dependency statement describes how to determine a value of the functor applied to each object; wherein a left side of the dependency statement is the functor symbols and parameter variables of the functor symbols, and a right side is statements containing a structure of if-then-else; when sampling, each sentence of the if-then-else statement is checked until a true sentence is found, a value of the functor corresponding to the true sentence is a parameter of the conditional probability distribution; if sentences of the if-then-else statement are all false, a return value of the functor is null, and a parameter of corresponding conditional probability distribution is also null;

the numerical statement creates a new object of the model, a left side of the numerical statement contains a set of conditions that constitute a potential object, a right side of the numerical statement has an identical form as the dependency statement;

besides the dependency statement and the numerical statement, the Blog model also comprises: a type declaration statement for introducing a type; a random function declaration statement for specifying a type label of the functor symbol, whose value is randomly selected during a generation process; a guarantee statement for guaranteeing and naming all the different objects in W;

on a basis of the model structure W, the Blog model is established by the dependency statement and the numerical statement to describe a generation process; the Blog model is configured to continuously add new objects to the model based on existing objects, so the Blog model is capable of containing objects which are changing and with unlimited number and uncertain relationships between the objects.

5. The method for establishing fault diagnosis technique based on the contingent Bayesian networks, as recited in claim 1, wherein the step (4) of transforming the Blog model into the contingent Bayesian networks comprises: taking type symbols $t_i$ and a set of functor symbols f in the Blog model as nodes of the Bayesian networks; taking a function symbol on a right side of a dependency statement of the functor symbol f, and a function symbol on a right side of a numerical statement of the symbols $t_i$ as a parent node; according to a generation process described by the Blog model, compiling an entire Bayesian network, which is denoted as BNs; wherein for the present invention, the software fault Fault and the environmental constrain Constrain of the software fault are nodes of the BNs; because an amount of the objects of the Blog model is uncertain, dependence relationships between the objects of the Blog model are also uncertain, BNs compiled according to the Blog model contain an infinite number of nodes and contain rings.

6. The method for establishing fault diagnosis technique based on the contingent Bayesian networks, as recited in claim 1, wherein the step (5) of defining the contingent Bayesian networks, comprises steps of: wherein a topology of the Bayesian network is a directed acyclic graph, and the BNs compiled according to the Blog model contain an infinite number of nodes and have a ring, which does not conform to definition of classical Bayesian networks, thus in the present invention BNs is converted to Contingent Bayesian Networks, denoted as CBNs;

according to actual situations, specifying mutually exclusive conditions for edges in the BNs pointing to an identical node and from identical nodes, under specific conditions, only a limited number of edges satisfy the specific conditions and are active, nodes connected by the limited number of edges have a logical causal relationship, and the nodes in an inactive state are ignored in analysis, that is, even there are an infinite number of ancestor nodes in the CBNs, the CBNs is only affected by a limited number of ancestors during analysis; and furthermore, specifying mutually exclusive conditions for edges of each ring of the CBNs as well; wherein only edges satisfying specific condition are active; edges failing to satisfy the specific condition are temporarily removed in analysis; by generating the CBNs for the edges of the BNs, problems of an unlimited number of nodes and rings are solved.

7. The method for establishing fault diagnosis technique based on the contingent Bayesian networks, as recited in claim 1, wherein the step (6) learning parameters of the contingent Bayesian networks comprises steps of: wherein since the present invention generates the contingent Bayesian networks from the Blog model, the network structure is determined, only performing parameter learning of the network, that is, determining conditional probability of each node of the contingent Bayesian networks; wherein the parameter learning refers to under conditions of a given network topology G and a training sample set D, utilizing a priori knowledge to determine the conditional probability distribution of each node of the dependence Bayesian network model;

performing parameter learning of the CBNs utilizing maximum likelihood estimation, assuming that there are n nodes in which the CBNs are active under specific conditions, which is noted as $\{X_1, \ldots, X_i, \ldots X_n\}$, and meanwhile assuming that the i-th node has $r_i$ values, and a parent node of $X_i$ is denoted as $pa(X_i)$, $pa(X_i)$ has $q_i$ values; parameters to be calculated is $\theta=\{\theta_{ijk}|i=1, \ldots, n; j=1, \ldots, q_i; k=1, \ldots, r_i\}$, where j and k respectively refer to values of the parent nodes $pa(X_i)$ and the node $X_i$; and logging likelihood function $L(\theta|D)$ to obtain:

$$l(\theta|D) = \log L(\theta|D) = \log \prod_{l=1}^{m} P(d_l|\theta) = \sum_{i=1}^{n} \sum_{j=1}^{q_i} \sum_{k=1}^{r_i} m_{ijk} \log \theta_{ijk};$$

wherein $m_{ijk}$ is a sample capacity in a sample set D that satisfies $X_i=k$ and $pa(X_i)=j$, the sum, $l(\theta|D)$ is a logarithm of the likelihood function $L(\theta|D)$, and performing Lagrangian multiplier method to a formula mentioned above to obtain maximum likelihood estimate of a parameter $\theta$, thereby determining parameters of the CBNs.

8. The method for establishing fault diagnosis technique based on the contingent Bayesian networks, as recited in claim 1, wherein in the step (7) of reasoning a fault of the contingent Bayesian networks by utilizing a Markov chain Monte Carlo Method, the Markov chain Monte Carlo Method is denoted as MCMC, wherein the MCMC is widely applied in Bayesian inference, Gibbs sampling which is of widest use in MCMC is adopted in the present invention to perform fault reasoning on the contingent Bayesian networks;

Gibbs sampling is a special case in MCMC, wherein a first dimension is alternately fixed, and values of other dimension are adopted to sample a value in the first dimension; if a probability of occurrence of an event $A=\{X_1, X_2, \ldots X_s\}$ needs to be reasoned, wherein $X_1, X_2, \ldots, X_s$ are nodes of CBNs, i.e., software fault Fault and environmental constrain of the fault Constrain, and $s \leq n$, wherein a joint probability distribution of an event A is denoted as $\Phi(A)$, wherein a process of the Gibbs sampling comprises steps of:

(1) initializing comprising: randomly giving $X_1, X_2, \ldots, X_s$ initial values $A_0=\{X_1^0, X_2^0, \ldots X_s^0\}$;

(2) generating $X_1^1$ by $p(X_1|X_2^0, \ldots X_s^0)$;

(3) in a same way as the step (2), fixing other variables, generating $X_2^1, \ldots, X_s^1$ in sequence to obtain a new event $A_1=\{X_1^1, X_2^1, \ldots X_s^1\}$; and (4) repeating steps 2-3 to obtain a Markov chain $\{A_1, A_2, \ldots A_t\}$ wherein t is a sampling time;

wherein through steps mentioned above, the conditional distribution is simulated to simulate the joint distribution, and then the conditional distribution is directly derived through the joint distribution simulated, in such a manner that the contingent Bayesian networks reasoning is achieved to complete fault diagnosis.

* * * * *